A. L. SWEET.
POULTRY FEEDER.
APPLICATION FILED OCT. 4, 1910.
1,002,782.
Patented Sept. 5, 1911.
2 SHEETS—SHEET 2.
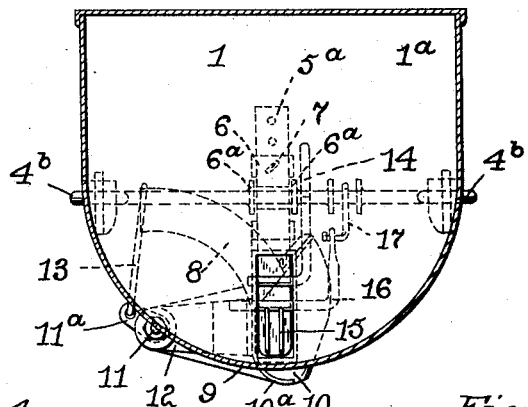
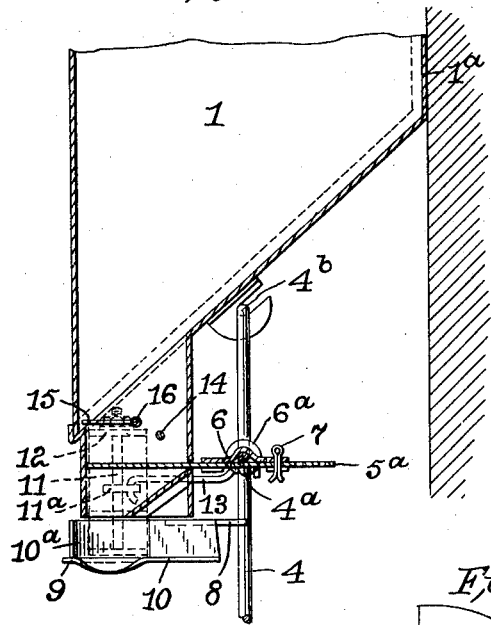
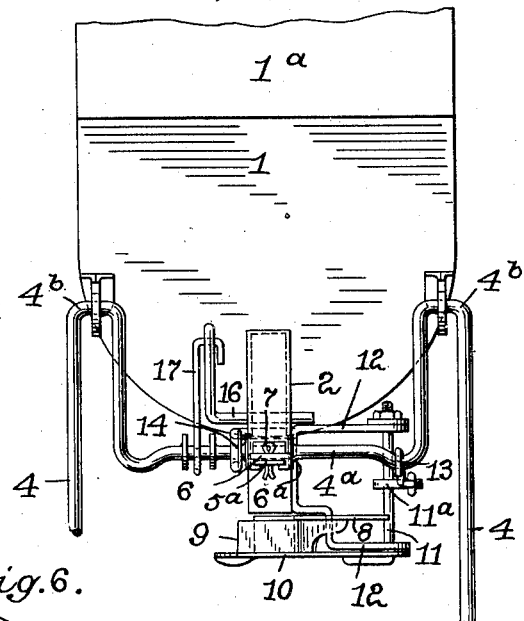
Attest:
Ewd L. Toleon
Bent. M. Stahl
Inventor:
Alonzo L. Sweet,
by Middleton Donaldson
Attys.

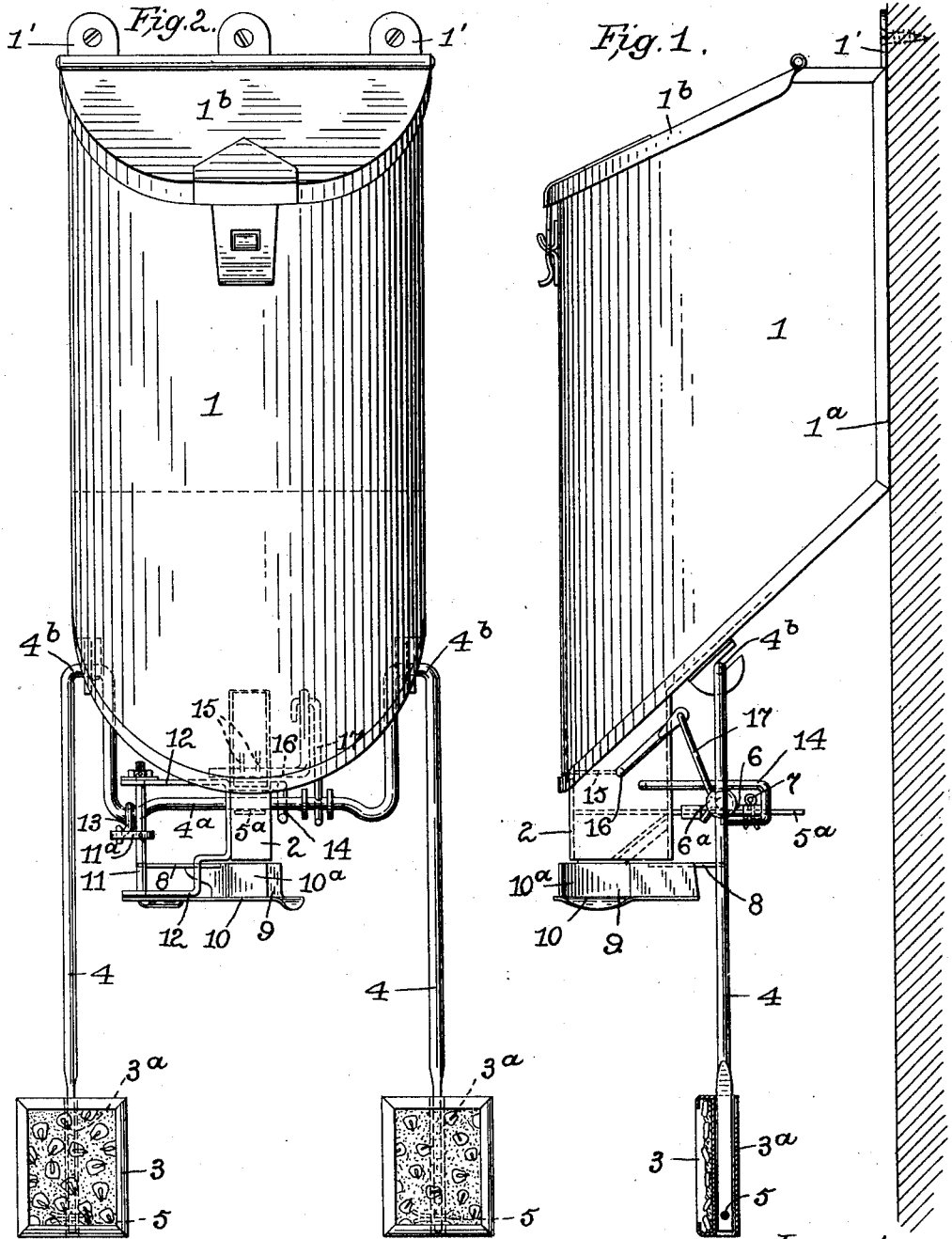

UNITED STATES PATENT OFFICE.

ALONZO LOUIS SWEET, OF NORWICH, CONNECTICUT, ASSIGNOR OF ONE-HALF TO HARRY W. WARD, OF NORWICH, CONNECTICUT.

POULTRY-FEEDER.

1,002,782.  Specification of Letters Patent.  Patented Sept. 5, 1911.

Application filed October 4, 1910. Serial No. 585,222.

*To all whom it may concern:*

Be it known that I, ALONZO L. SWEET, a citizen of the United States, residing at Norwich, Connecticut, have invented certain new and useful Improvements in Poultry-Feeders, of which the following is a specification.

My present invention relates to improvements in poultry feeding devices of the class in which the grain or like food is stored in a tank or receptacle from which it is adapted to be delivered in small quantities to the poultry as needed, the delivery being controlled entirely by the poultry.

Among the objects of the invention are to provide a simple, economical and efficient device, of a sanitary nature, which will deliver the food in small quantities and only as the poultry are impelled by hunger to actuate said device, which will prevent waste of food, but which will also scatter the food delivered so as to prevent crowding of the poultry immediately under the feeder, and which may be used equally well inside of poultry houses or in the open.

Other objects and advantages are also incident to my improved feeder as will hereinafter appear.

The invention includes the novel features of construction and arrangement of parts hereinafter described and particularly defined in the appended claims.

A feeder constructed in accordance with my invention is illustrated in the accompanying drawings, in which—

Figure 1 is a side elevation of a device embodying my invention attached to a wall or suitable support, with the feed pad showing in section; Fig. 2 is a front elevation of the same; Fig. 3 is a transverse sectional view through the tank; Fig. 4 is a central vertical sectional view through the lower portion of the tank; Fig. 5 is a detail, viewed from the rear of the device, and Fig. 6 is a detail plan view of the grain distributer and cut-off plate showing its pivotal mounting, with the bracket therefor shown in dotted lines.

Referring by reference characters to this drawing, the numeral 1 designates a suitable hopper or receptacle for holding a suitable quantity of grain, which is provided with ears or like devices, as indicated at 1', by which it may be suspended from a wall, post, or other convenient place. It is preferably constructed of non-corrodible metal and provided with a flat back wall $1^a$ to enable it to rest steadily against the support upon which it is hung. It is provided with a hinged cover $1^b$, which is sloped to shed moisture and also to prevent the poultry from finding standing room thereon. The bottom of the hopper is also sloped or inclined to cause all the grain contained therein to gravitate to the delivery chute 2. The delivery of grain through the chute is controlled by suitable bait holding devices actuated by the depending feed pads 3 through mechanism hereinafter described, which feed pads are moved by the poultry in their efforts to get the food carried by the pads. These pads are preferably of sheet metal of shallow box-like or tray form disposed vertically and having grain, such as kernels of corn, cemented thereto by a water proof cement. The pads are designed to be located at such a distance from the ground as to cause the poultry, in their desire to reach the grain carried thereby, to jump, and the impact of the bill in so jumping will cause the pads to move rearwardly, and through the connections referred to, deliver a measured charge of grain in the manner hereinafter described. The pads are carried upon the lower ends of the vertically disposed swinging arms 4 and are preferably made detachable, so as to be capable of being removed and replaced should the grain carried thereby need replenishing. A convenient means of effecting such detachable connection is to flatten the ends of the rods and seat them in correspondingly shaped sockets $3^a$ on the backs of the pads, in which they are secured by cotter pins 5. The arms are hinged at their upper ends to the hopper, and I prefer to make both arms of a single rod of metal having its central portion $4^a$ offset from the pivots of the rods to form a crank, the pivots being formed by the bends $4^b$ which are hung in hook-shaped brackets secured to the bottom of the hopper. The open hooks of the brackets serve to permit the arms to be readily removed for convenience in shipping.

Normally the arms and pads are caused by the action of gravity to hang in a vertical position, and when in this position the delivery chute 2 is closed by a slide 5ª, which is operatively connected with the central portion 4ª or crank of the rod. In order that the position of the slide may be adjusted to suit different requirements or conditions, I provide a plate 6 which has a recessed portion which receives the crank and lies between two collars 6ª, which prevent endwise movement. The slide 5ª is provided with a plurality of holes, and the plate 6 is also apertured so that the two may be adjustably connected by cotter pins 7, as shown.

The slide 5ª enters the chute through a slot in the rear wall thereof at a short distance from the lower end. As the slide is moved rearwardly, the lower end of the chute is closed by a swinging cut-off or plate 8 carried by the grain distributer 9, such cut-off plate and slide coöperating to cause a measured charge of grain to be delivered to the distributer. Said distributer comprises a substantially horizontally disposed grain receiving plate 10, having a curved wall 10ª, which plate 10 is carried by a vertically disposed rod 11 rotatably mounted in brackets 12 projecting from the chute. This rod 11 has a crank arm 11ª which is connected by a link 13 with the crank 4ª. Thus as the pads and depending arms are swung rearwardly wthdrawing the slide from the chute, the distributer is swung forwardly causing the cut-off plate to close the lower end of the chute. As the arms swing forward again and the slide reënters the chute, the cut-off plate is removed from beneath the chute and the distributer plate occupies a position directly beneath the chute, allowing the segregated portion of the grain within the chute to drop upon the distributer plate. On the next forward movement of the distributer plate, the impulse given thereto causes the grain thereon to be thrown forward, scattering it upon the ground at some distance from the feeding device, thus preventing the crowding of the poultry directly beneath the feeding device.

In order to limit the rearward movement of the swinging arms, I provide a suitable stop device, as indicated at 14.

With some kinds of grain there would be danger of its clogging in the chute, and to avoid this I provide therein an agitator 15 carried on a rock shaft 16 and operated by a link 17 connecting it to the crank 4ª.

Having thus described my invention what I claim is:

1. In a poultry feeding device, a suitable hopper having a discharge chute, a cut-off slide located in said chute at a suitable distance from the bottom, a movable cut-off plate for the lower end of said chute, a grain scattering device connected with said cut-off plate and receiving the grain from the chute on the removal of the cut-off plate, and poultry controlled devices for operating said cut-off slide and plate and said distributer.

2. In a poultry feeding device, a suitable hopper having a discharge chute, a cut-off slide located therein, a movable cut-off plate, a distributer plate adjacent to said cut-off plate and depressed below the level thereof to provide for the reception of grain on the removal of the cut-off plate from beneath the chute, and poultry controlled means for operating said cut-off slide and cut-off plate and distributer plate.

3. In a poultry feeding device, a hopper having a feed chute, a cut-off slide in said chute, a horizontally swinging member having an elevated portion constituting a cut-off plate and a depressed portion constituting a distributer plate, and poultry controlled means for operating said parts.

4. In a poultry feeding device, a hopper having a feed chute, a cut-off slide in said chute, a horizontally swinging member having a cut-off plate and a distributer plate, a swinging bait carrying rod depending from said hopper and having a crank arm or portion connected therewith, and connections from said crank arm to said cut-off slide and swinging member.

5. In a poultry feeding device, a hopper having a delivery opening, means for feeding measured charges of grain therethrough, a bait carrying device comprising a single rod bent to provide depending bait carrying arms, and a depressed intermediate crank portion, brackets carried by said hopper and pivotally engaging the portions of said rod between said arms and crank portion, and connections between said crank portion and said feeding means for operating the latter.

6. In a poultry feeding device, a hopper having a feed chute, a cut-off slide therein, a horizontally disposed oscillating cut-off plate at the lower end of said feed chute, a freely swinging depending bait carrying arm, a horizontally disposed rod moved thereby, a connection between said rod and cut-off slide, a vertical shaft connected to said oscillating plate, and a crank arm on said shaft connected to said horizontally disposed rod.

7. In a poultry feeding device, a hopper having a feed chute, a cut-off slide therein, a horizontally disposed oscillating cut-off plate at the lower end of said feed chute, a freely swinging depending bait carrying arm, a horizontally disposed rod moved thereby, an adjustable connection between said rod and cut-off slide, a vertical shaft connected to said oscillating plate and a crank arm on said shaft connected to said horizontally disposed rod.

8. In a poultry feeding device, a hopper having a feed chute, a cut-off slide therein, a horizontally disposed oscillating cut-off plate at the lower end of said feed chute, a freely swinging depending bait carrying arm, means for limiting the swinging movement of said arm, a horizontally disposed rod moved thereby, a connection between said rod and cut-off slide, a vertical shaft connected to said oscillating plate, and a crank arm on said shaft connected to said horizontally disposed rod.

9. In a poultry feeding device, a hopper having a feed chute, a cut-off slide therein, a horizontally disposed oscillating cut-off plate at the lower end of said feed chute, a freely swinging depending bait carrying arm, a horizontally disposed rod moved thereby, a connection between said rod and cut-off slide, a vertical shaft connected to said oscillating plate, a crank arm on said shaft connected to said horizontally disposed rod, and an agitator in said feed chute operated from said cross rod.

In testimony whereof, I affix my signature in presence of two witnesses.

ALONZO LOUIS SWEET.

Witnesses:
JAMES E. FULLER,
JANE G. MURRAY.

Copies of this patent may be obtained for five cents each, by addressing the "Commissioner of Patents, Washington, D. C."